US010520053B2

(12) United States Patent
Crippa et al.

(10) Patent No.: US 10,520,053 B2
(45) Date of Patent: Dec. 31, 2019

(54) HEAT SHIELD ELEMENT

(71) Applicant: FRENI BREMBO S.P.A., Curno, Bergamo (IT)

(72) Inventors: Cristian Crippa, Curno (IT); Mirko Castellana, Curno (IT)

(73) Assignee: Freni Brembo S.p.A., Curno, Bergamo (IT)

( * ) Notice: Subject to any disclaimer, the term of this patent is extended or adjusted under 35 U.S.C. 154(b) by 0 days.

(21) Appl. No.: 15/750,365

(22) PCT Filed: Aug. 2, 2016

(86) PCT No.: PCT/IB2016/054634
§ 371 (c)(1),
(2) Date: Feb. 5, 2018

(87) PCT Pub. No.: WO2017/021874
PCT Pub. Date: Feb. 9, 2017

(65) Prior Publication Data
US 2018/0231083 A1 Aug. 16, 2018

(30) Foreign Application Priority Data
Aug. 5, 2015 (IT) .................. 102015000042457

(51) Int. Cl.
*F16D 65/847* (2006.01)
*F16D 65/78* (2006.01)
*F16D 55/00* (2006.01)

(52) U.S. Cl.
CPC .... *F16D 65/847* (2013.01); *F16D 2055/0037* (2013.01); *F16D 2065/785* (2013.01)

(58) Field of Classification Search
CPC .......... F16F 65/00; F16F 65/02; F16F 65/847; F16F 2055/0037; F16F 2065/785
See application file for complete search history.

(56) References Cited

U.S. PATENT DOCUMENTS

| 4,450,940 A * | 5/1984 | Herbulot ............... F16D 55/228 188/264 A |
| 2001/0019003 A1* | 9/2001 | Jackwerth ............... F16D 41/07 192/45.1 |
| 2017/0009833 A1* | 1/2017 | Gallagher ............. F16D 55/228 |

FOREIGN PATENT DOCUMENTS

| DE | 20213227 U1 | 6/2003 |
| GB | 2074265 A | 10/1981 |

(Continued)

OTHER PUBLICATIONS

Machine-generated English translation of DE20213227, obtained via Espacenet Patent Search.
(Continued)

*Primary Examiner* — Melanie Torres Williams
(74) *Attorney, Agent, or Firm* — Marshall & Melhorn, LLC

(57) ABSTRACT

A heat shield element for a brake caliper of a disc brake, capable of providing complete radial and axial protection for the brake caliper, which is arranged straddling a disc brake disc and having a vehicle-side elongated portion and an opposite wheel-side elongated portion connected to each other by at least one caliper bridge. The element has a heat shield element body having at least two opposite snap engagement tongues adapted to snap-engage a portion of the brake caliper to interpose the heat shield element body between the brake caliper and the disc brake disc and support the heat shield element engaged with the brake caliper.

9 Claims, 6 Drawing Sheets

(56) References Cited

FOREIGN PATENT DOCUMENTS

JP      S58102838 A    6/1983
JP      2015110985 A   6/2015

OTHER PUBLICATIONS

Machine-generated English translation of JPS58102838, obtained via Espacenet Patent Search.
Machine-generated English translation of JP2105110985, obtained via Espacenet Patent Search.
International Search Report of International Application No. PCT/IB2016/054634, dated Oct. 31, 2016.

* cited by examiner

HEAT SHIELD ELEMENT

FIELD OF THE INVENTION

The present invention relates to a heat shield element for a brake caliper, to a caliper assembly for disc brake comprising a heat shield element, and to a method for obtaining a heat shield element for a brake caliper.

BACKGROUND ART

In a disc brake, the brake caliper is generally arranged straddling the outer peripheral margin of a brake disc, adapted to rotate about a rotation axis defining an axial direction (X-X). In a disc brake, a radial direction (R-R), arranged substantially orthogonal to said axial direction (X-X), and a tangential or circumferential direction (C-C), orthogonal to both said axial direction (X-X) and said radial direction (R-R), are further defined.

The brake calipers are constrained to a supporting structure which remains stationary with respect to the vehicle, such as, for example, a spindle of a vehicle suspension or a vehicle wheel hub. The brake caliper usually comprises a caliper body comprising two elongated portions arranged so as to face opposite braking surfaces of a brake disc and at least one bridge, which connects said two elongated portions to each other.

In a typical arrangement of a disc brake on a vehicle, a braking surface of the brake disc faces the vehicle defining the vehicle-side disc brake and the opposite braking surface of the brake disc faces the vehicle wheel defining the wheel-side of the disc brake. So, when the brake caliper is mounted on a brake disc, a first elongated portion of the caliper body is on vehicle-side and a second elongated portion of the caliper body is on wheel-side. Brake pads are provided arranged between each elongated portion of the caliper body and the facing braking surfaces of the brake disc. At least one of the elongated portions of the caliper body has cylinders adapted to accommodate hydraulic pistons capable of exerting a thrust action on the Brake pads, abutting them against the braking surfaces of the disc to apply the braking action on the vehicle.

This braking action on the vehicle applies a considerable friction adapted to create the desired braking torque on the vehicle itself, the braking torque in all cases contextually transforming the motion energy of the vehicle into heat, which is accumulated in the disc and in the pads. The heat from the braking surfaces extends into the entire body of the brake disc, radiating and consequently heating and sometimes overheating, the caliper body which is arranged straddling it, sometimes deteriorating the properties, e.g. the mechanical properties, of the material of which the brake caliper is made.

Indeed, the need to limit the unsprung vehicle weights to the maximum leads to making caliper bodies of strong materials which are as light as possible. For example, the caliper bodies are made of aluminum or aluminum alloys which have particular mechanical strength and a sufficiently low weight, the strength being equal. Brake calipers having caliper bodies made either entirely or partially of composite material, which may be even more sensitive to heat stress than aluminum, have recently been suggested.

The need to protect the caliper body, in particular in its zone bridge-arranged straddling the disc and in its portions facing the brake disc, is thus strongly felt.

Document JP2015110985 shows a heat shield element of a radial portion of a floating body of a brake caliper. This known solution is suitable for small floating calipers having a limited circumferential extension which does not expose the elongated elements on vehicle-side, and even less so those on wheel-side, to directly face the overheated surfaces of the brake disc.

The need is thus strongly felt to provide a heat protection for the caliper body, where the latter has a circumferential extension which exposes the connection points of the elongated elements to directly face the overheated brake disc, together with the parts of the elongated portions which directly face the braking surfaces by extending circumferentially by the side of the brake pads, which constitute a heat barrier in themselves.

Such a need is particularly felt in the brake calipers used for high-performance vehicles, which for structural purposes, have considerable circumferential extensions adapted to stiffen the elongated portions on vehicle-side and on wheel-side with the end bridges. Such circumferentially extended bridges stiffen the behavior of the brake caliper which is suitable for strong stresses, such as those applied during the hard braking required for quick vehicle decelerations. Furthermore, these rapid decelerations determine greater concerned energies, and thus greater heating of the brake disc and thus greater mechanical stresses for the caliper body.

Therefore, the need is strongly felt to protect the bridge zone of the caliper body as well as the adjacent elongated portions.

The need is also felt to manufacture these heat protections in a simple and quick manner in terms of construction and assembly, without losing their efficacy in all cases.

Solution

It is an object of the present invention to avoid the drawbacks of the prior art and to provide a solution to the needs of providing a heat shield adapted to protect at least one bridge of the brake caliper and of the surrounding elongated portions which can be made simply and effectively.

These and other objects are achieved by a heat shield element according to claim 1, and by a brake caliper assembly with element according to claim 7, and by a method for obtaining a heat shield element according to claim 9.

Some advantageous embodiments are the object of the dependent claims.

By providing a heat shield element according to the claims, the need to protect at least one connection bridge of the elongated portions of the brake caliper and at the same time parts of the surrounding portions of the elongated portions, which would otherwise directly face the braking surfaces of the brake disc, is satisfied effectively and completely.

Furthermore, by virtue of the suggested solutions, it is possible to provide a heat shield element which is easy to be manufactured, in one piece, and easy to be assembled.

The suggested solutions allows, in particular, to block the radiation emitted by the brake disc towards the directly facing portions of the caliper body.

According to some embodiments, it is possible to simultaneously block the radiation from the brake disc towards the caliper body to permit a ventilation which insinuates between the heat shield element itself and the caliper body, thus reducing thermal stress even more.

DRAWINGS

Further features and advantages of the heat shield element, assembly and method will become apparent from the following description of preferred embodiments, given by way of non-limiting examples, with reference to the accompanying drawings, in which.

DESCRIPTION OF SOME PREFERRED EMBODIMENTS

Figure 1:
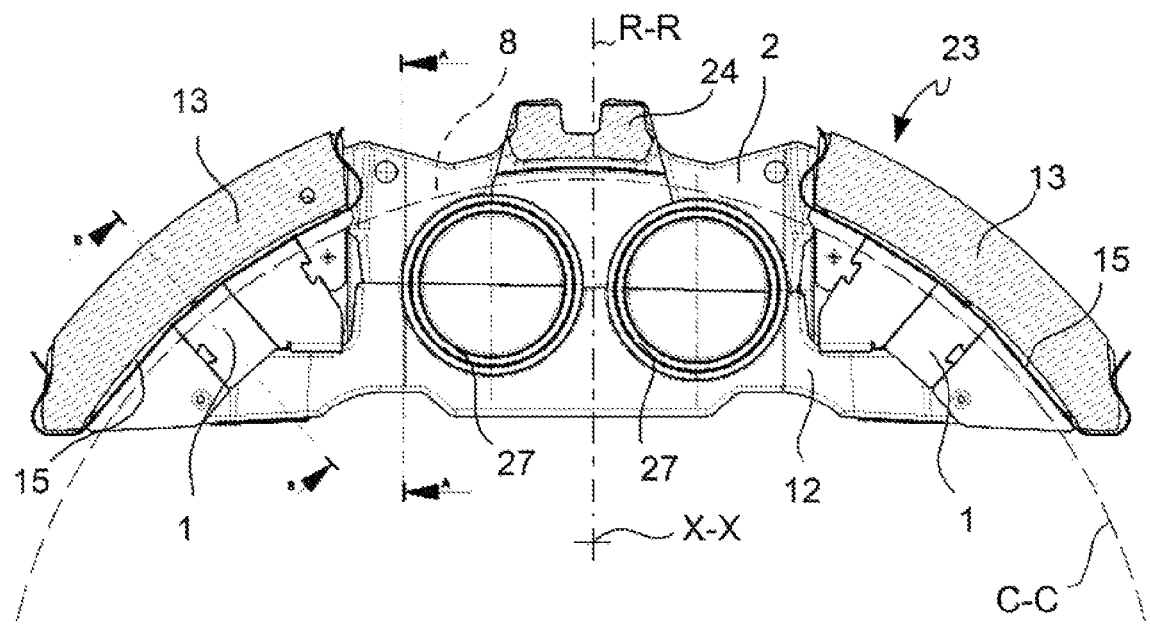
FIG. 1 is a section view taken along a radial plane of a brake caliper assembly with which a pair of sheet-like heat shields are associated to protect the connection bridges of the elongated portions from heat and to protect the elongated portions themselves.

According to a general embodiment, a heat shield element is indicated by reference numeral (1) in the figures. Such an element is suitable for a brake caliper (2) of a disc brake arranged straddling a disc brake disc (8) and having a vehicle-side elongated portion (11) and an opposite wheel-side elongated portion (12). Said portions are connected to each other by means of at least one caliper bridge (13).

Said heat shield element (1) comprises a heat shield element body (3) made in one piece.

For example, said heat shield element is obtained from a metal sheet, e.g. made of iron or steel or stainless steel, brass, but also of composite material, e.g. a resin or a filled resin and shaped e.g. in a mold or a polymer. For example, said element is a sheet obtained from a flat sheet (4) cut to shape and bent by die-cutting.

Said heat shield element (3) comprises at least two opposite snap engagement tongues (7) adapted to snap-engage a portion of the brake caliper (2) to interpose said heat shield element body (3) between said brake caliper (2) and said disc brake disc (8) and to support said heat shield element (1) engaged with said brake caliper (2).

Said heat shield element body comprises at least one arched back (9) extended along a circumferential direction (C-C) so as to extend following a curved line from an inner end (5) to an outer end (6) of said element.

Advantageously, said heat shield element body (3) comprises at least two mutually opposite side shield portions (10), each extending orthogonally to said circumferential direction (C-C) in a radial plane (R-R).

Said at least two side shield portions (10) form with said arched back (9), transversely to said circumferential direction (C-C), an inverted "U" section adapted to place said heat shield element body (3) straddling said disc brake disc (8).

With further advantage, said at least two opposite snap engagement tongues (7) are arranged one at said inner end (5) of the arched back (9), the other at said outer end (6) of the arched back (9), so as to embrace and engage said at least one caliper bridge (13) therebetween, thus placing said arched back (9) between said at least one caliper bridge (13) and said disc brake disc (8) and each of said at least two side shield portions (10) between a portion of said elongated portions (11, 12) and said disc brake disc (8) as a heat protection of the brake caliper (2).

According to an embodiment, said heat shield element body (3) comprises caliper resting elements (14) like spacers, or spacers, (14) which constitute the only resting means of the sheet to the brake caliper (2).

According to an embodiment, said spacers (14) are adapted to rest on the brake caliper (2) and create an air space (15) between said sheet body (3) and said brake caliper (2).

According to an embodiment, said spacers (14) have a hemispherical shape in order to obtain an abutment between the heat shield element (1) and the brake caliper (2) having a very limited contact area, preferably point-like, and limit heat transfer between the heat shield element (1) and the brake caliper (2).

According to an embodiment, said spacers (14) are limited in number to two or four for the arched back (9) and/or to one or two for the at least one or the set of the side shield portions (10), so as to limit the contact areas between the heat shield element (1) and the brake caliper (2).

According to an embodiment, said spacers (14) are obtained by molding of the sheet heat shield element body (3), forming bulges adapted to project towards the brake caliper (2).

According to an embodiment, said sheet body (3) has a shape or outer perimeter (16) as a die-cut body which from a flat sheet configuration is adapted to be bent to form said at least two snap engagement tongues (7), said at least one arched back (9) and said at least two opposite side shield portions (10) of said heat shield element (1).

According to an embodiment, each of said at least two side shield portions (10) juts orthogonally cantilevered from said arched back (9).

According to an embodiment, each of said side shield portions (10) are a plurality of side shield portions (10) arranged mutually side-by-side as a protection of sector-like extended portions of the elongated portions (11, 12) of the brake caliper (2).

According to an embodiment, said plurality of side shield portions (10) arranged mutually side-by-side comprise contiguous sides (17, 18) one having engagement seats (20) and the other having engagement portions (19) adapted to be connected in said engagement seats (20), so as to limit the movement and vibrations of said side shield portions.

According to an embodiment, said arched back (9) and said plurality of opposite side shield portions (10) arranged mutually side-by-side are like carapace scales in a single piece adapted to be shaped into a radial (R-R) and axial (X-X) heat protection of an inner surface portion (21) of a brake caliper (2) which can face a brake disc (8).

According to an embodiment, said heat shield element body (3) comprises at least one radial support (22) adapted to rest as an undercut on the brake caliper (2) and to preload the snap engagement of the heat shield element (1) when engaged with the at least one caliper bridge (13).

According to an embodiment, said at least one radial support (22) is formed by a pair of opposite radial supports (22) arranged cantilevered and transverse to two opposite side shield portions (10).

According to an embodiment, each of said snap engagement tongues (7) comprises cantilevered jutting grip portions (28).

According to an embodiment, said cantilevered jutting grip portions (28) project partially laterally and/or at the top outside the brake caliper (2) like radiators for heat disposal.

A caliper assembly comprising at least one heat shield element will now be described.

A caliper assembly (23) for a disc brake comprises a caliper body (24). Said caliper body (24) is adapted to straddle a brake disc (8). Said brake disc (8) comprises a first braking surface (25), or vehicle-side braking surface, and a second braking surface (26), or wheel-side braking surface (26), opposite to said first braking surface (25).

Said caliper body (24) comprises a first elongated portion (11), or vehicle-side elongated portion (11), adapted to face said first braking surface (25), and a second elongated portion (12), or wheel-side elongated portion (12), opposite to said first elongated portion (11) and adapted to face said second braking surface (26).

Said caliper body (24) comprises at least one bridge (13) which connects said first elongated portion (11) to said second elongated portion (12) so as to straddle the brake disc (8), when said caliper body (24) is assembled to the brake disc (8).

Advantageously, at least one heat shield element (1) according to any one of embodiments described above is snap-engaged to said at least one bridge (13).

According to an embodiment, said caliper body (24) is a fixed-type caliper body having opposite thrust means (27) for brake pads housed in said opposite elongated portions (11, 12).

According to an embodiment, said caliper body (24) is a floating-type caliper body having thrust means (27) for brake pads in a single one of the elongated portions (11).

Figure 8:
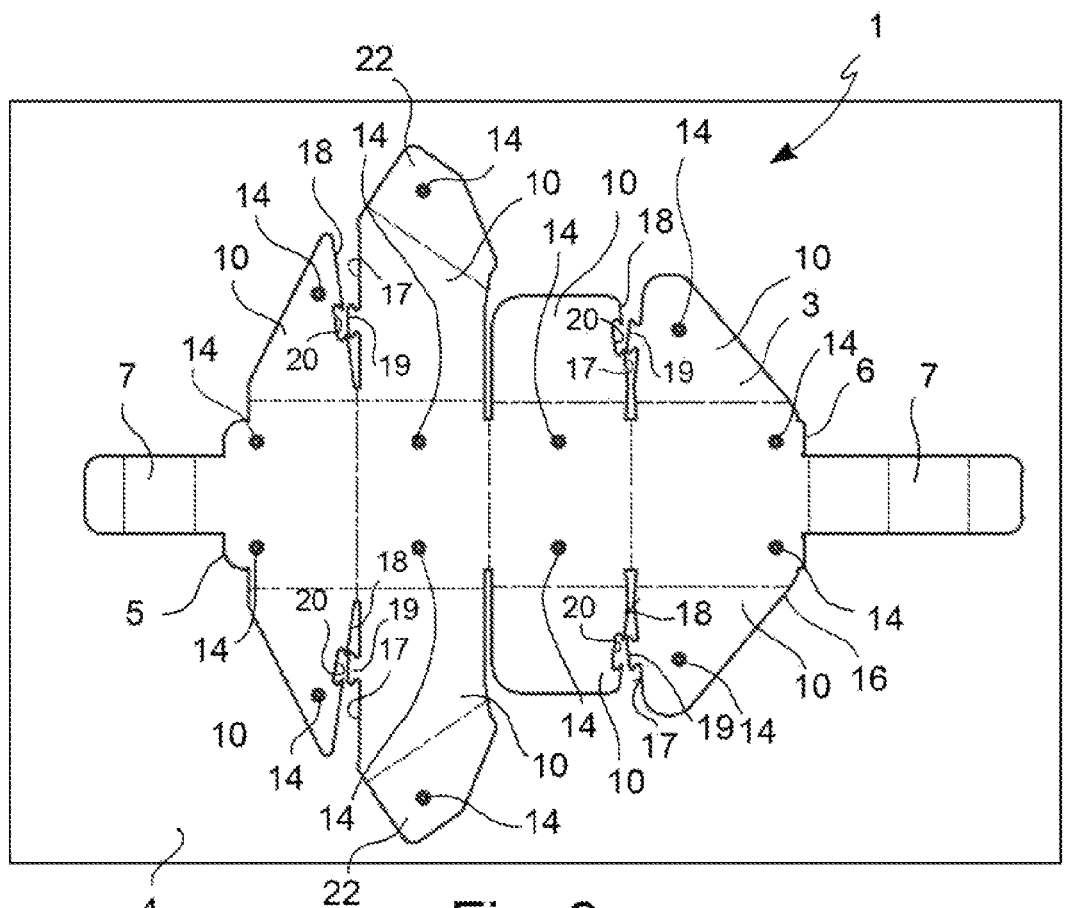
FIG. 8 is a plan view of the perimeter or footprint of a heat shield element according to a different embodiment and not yet separated, e.g. sheared, from a flat sheet or plate, where the various heat shield element portions—in this case, a sheet—are visible before they are cut, bent and possibly molded and coupled to form a three-dimensional shield of the caliper portions.

According to an embodiment, as shown in FIG. 8, the heat shield element is obtained by cutting a flat sheet. The perimeter (16) or the footprint of a heat shield element (1), according to a different embodiment in plan view, when not yet separated, e.g. by shearing, from the remaining portions of a sheet or flat sheet (4), leaving scrap, can be observed in this figure. This figure shows the various element portions of heat shield—in this case, a sheet—before they are cut, bent and possibly molded and coupled to form a three-dimensional shield of the caliper portions.

Figure 9:
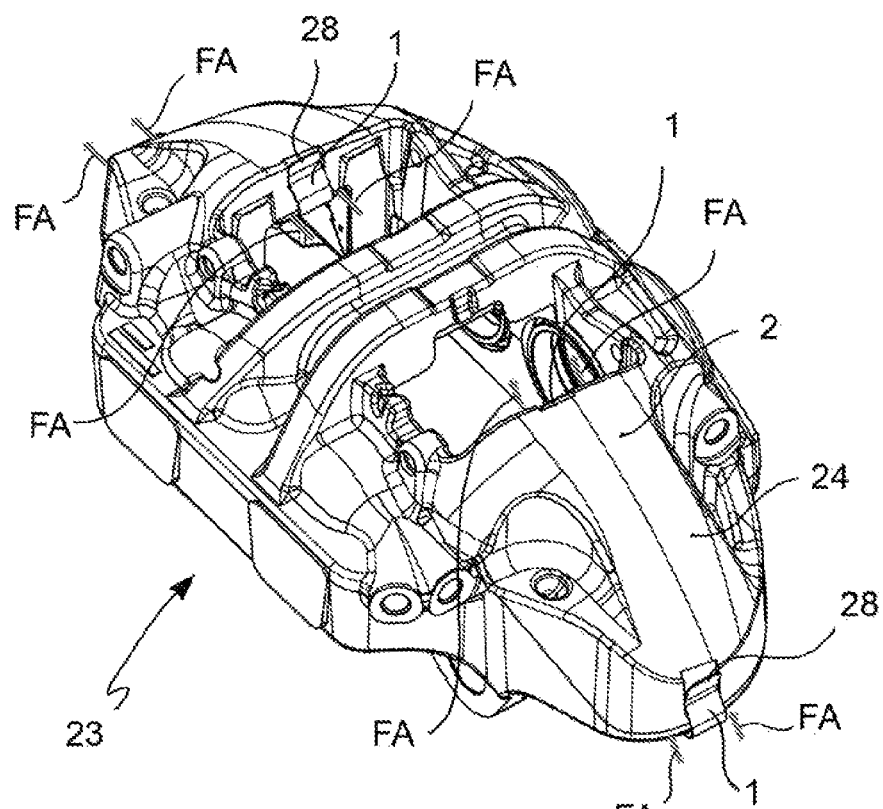
FIG. 9 shows an axonometric top view of a caliper assembly with two heat shield element sheets in which the cooling air flows are highlighted, by the arrows FA, which by virtue of the movement of the vehicle, and in particular of the vehicle wheel, circulate in the air space formed between the heat shield element and the caliper body creating a cooling air gap.
Figure 10:
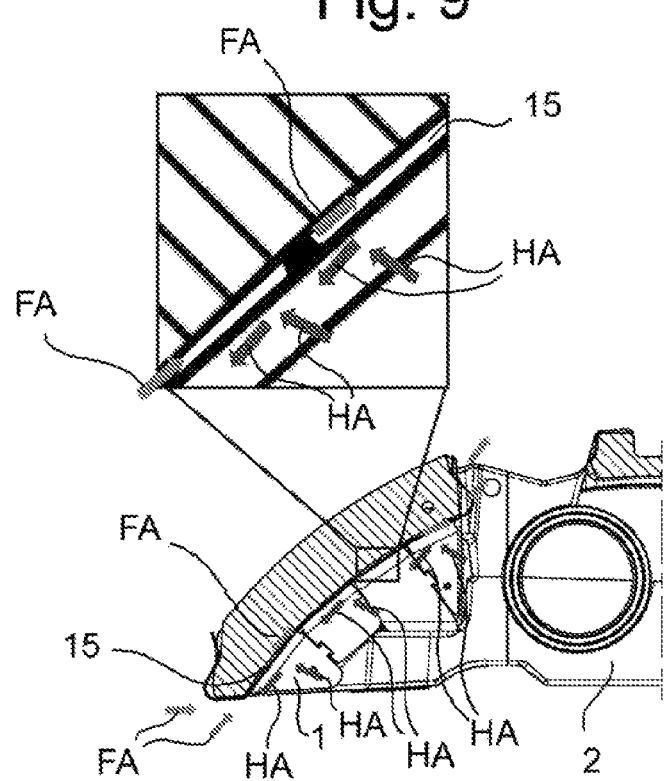
FIG. 10 shows a section view taken along the radial plane of part of the caliper in FIG. 9 and an enlargement of the air space, in which the cooling air flow is highlighted by the arrows FA and the hotter air flow is highlighted by the arrows HA, which air flows from the disc reach the side of the heat shield element facing the disc without touching the caliper body.
Figure 11:
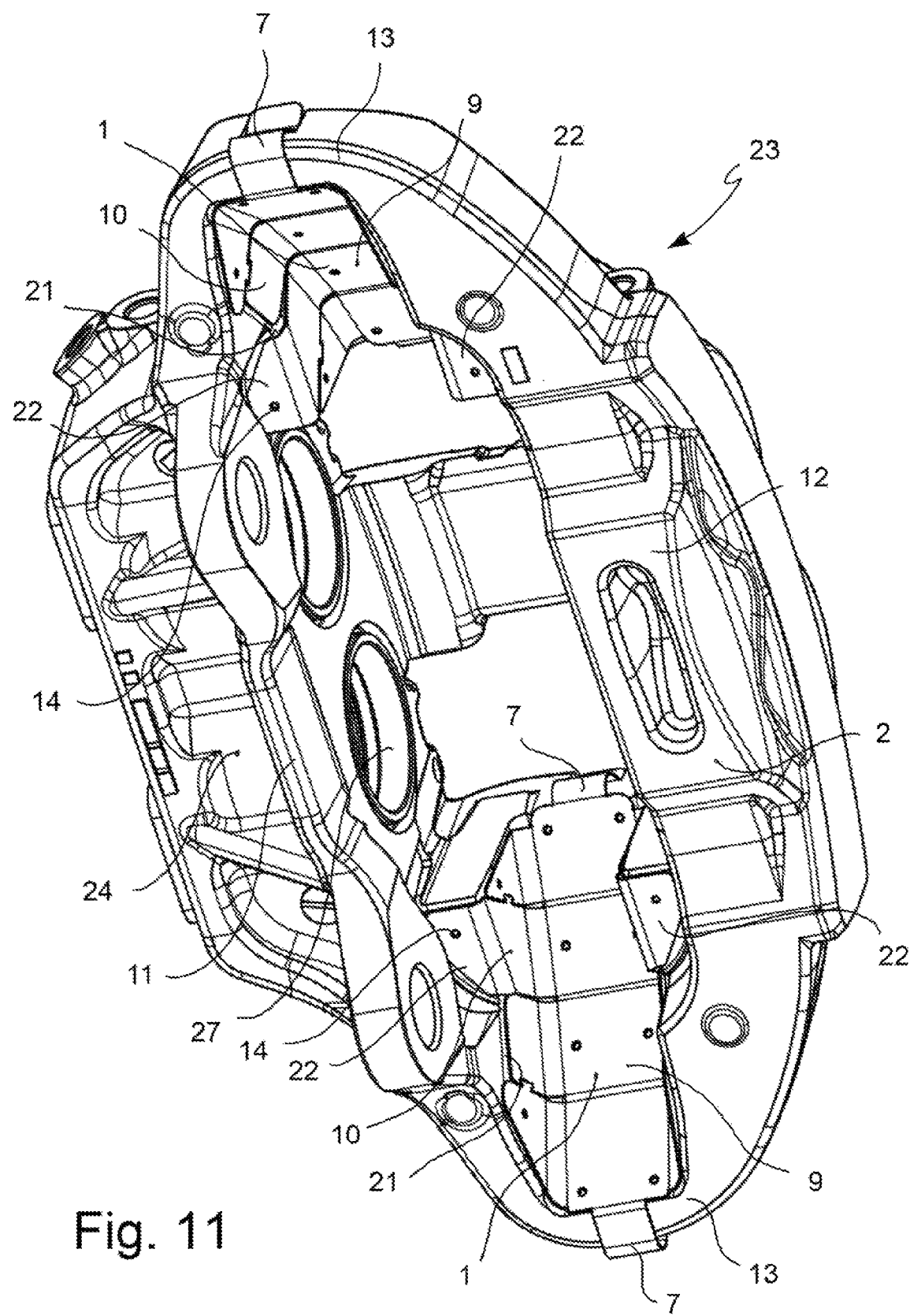
FIG. 11 is an axonometric view of the inner side of the caliper assembly in FIG. 9.

Figures from 9 to 11 shows a caliper assembly (23) with two heat shield element sheets (1) in which the cooling air flows are highlighted, by the arrows FA, which by virtue of the movement of the vehicle, and in particular of the vehicle wheel, circulate in the air space formed between the heat shield element and the caliper body creating a cooling air gap. In particular, FIG. 10 shows a section view taken along the radial plane of part of the caliper in FIG. 9 and an enlargement of the air space, in which the cooling air flow is highlighted by the arrows FA and the hotter air flow is highlighted by the arrows HA, which air flows from the disc reach the side of the heat shield element facing the disc without touching the caliper body, while FIG. 11 is an axonometric view of the inner side of the caliper assembly in FIG. 9, in which the shielding that the element (1) can provide to the radial portion of the bridges (13) and also to the elongated portions (11, 12) of the caliper facing the disc brake disc (8) can be observed.

A method for obtaining a heat shield element will be described below.

The method for obtaining a heat shield element comprises the steps of:
   providing a flat sheet (4);
   cutting said flat sheet (4) to shape;
   molding an arched back (9); and
   subsequently or simultaneously molding at least two opposite snap engagement tongues (7);
   subsequently or simultaneously molding at least two opposite side shield portions (10) orthogonal to said arched back (9).

According to an embodiment of the method, the step of cutting said flat sheet (4) to shape is a step of shearing.

According to an embodiment of the method, spacers (14) adapted to limit the resting areas of the element (1) on a caliper (2) are molded either subsequently or simultaneously with the molding of the arched back (9).

According to an embodiment of the method, shearing to shape includes shearing a plurality of side shield portions (10) and it includes the step of engaging the side shield portions arranged mutually side-by-side and contiguously.

According to an embodiment of the method, said heat shield element (1) is snap-engaged with a caliper bridge (13), so that it shields heat radiation of a brake disc (8).

According to an embodiment of the method, said heat shield element (1) is snap-engaged with a caliper bridge (13), so as to allow the air to pass between the heat shield element (1) and the brake caliper (2).

Those skilled in art may make many changes and adaptations to the embodiments described above or may replace elements with others which are functionally equivalent in order to meet contingent needs without however departing from the scope of the following claims.

Figure 2:
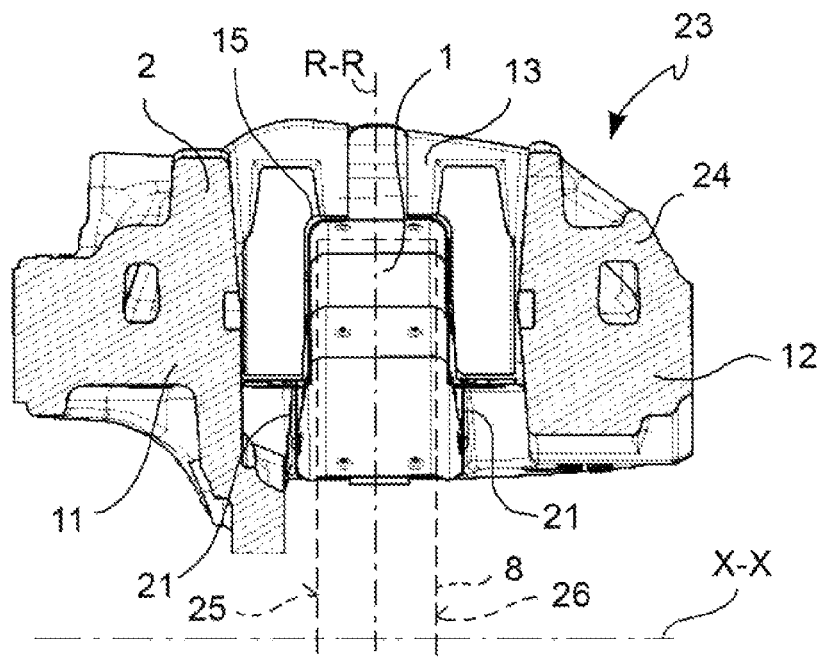
FIG. 2 is a section taken along line A-A in FIG. 1 of the assembly in FIG. 1.
Figure 3:
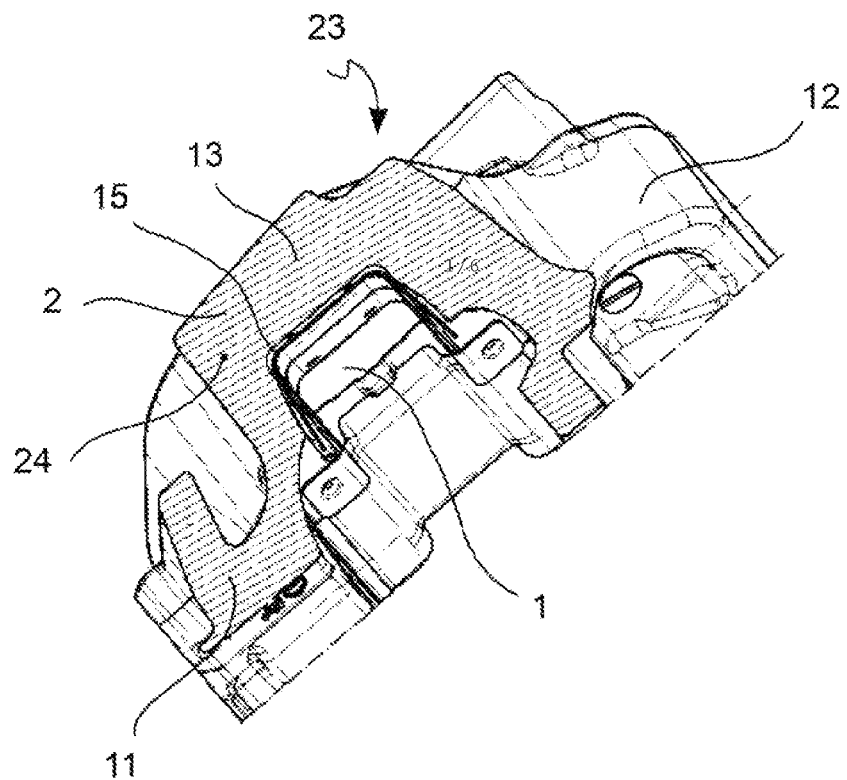
FIG. 3 is a section view taken along line V-B in FIG. 1 of the assembly in FIG. 1.
Figure 4:
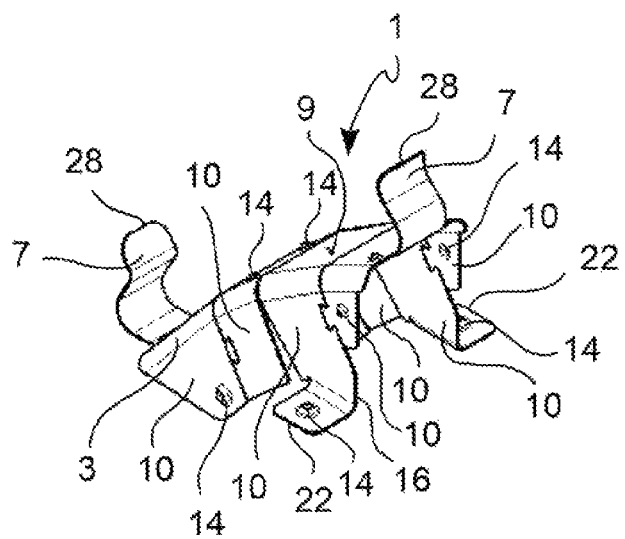
FIG. 4 is an axonometric view of a heat shield element.
Figure 5:
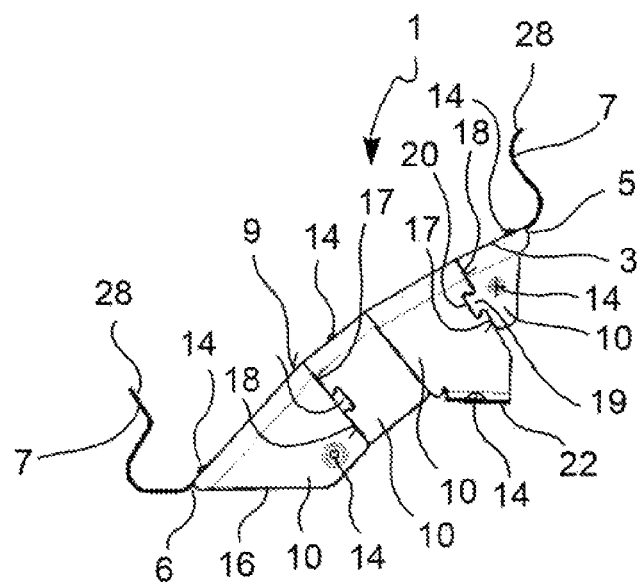
FIG. 5 is a side view taken along the axial direction of the element in FIG. 4.
Figure 6:
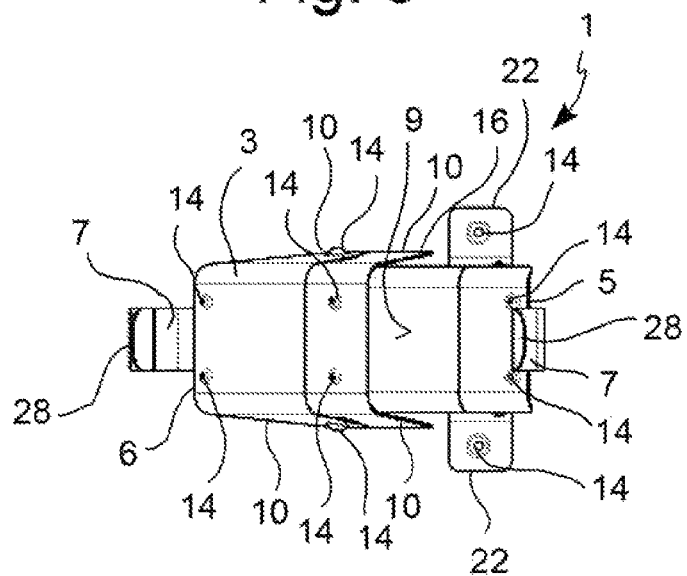
FIG. 6 is a view taken along the outer radial direction of the element in FIG. 4.
Figure 7:
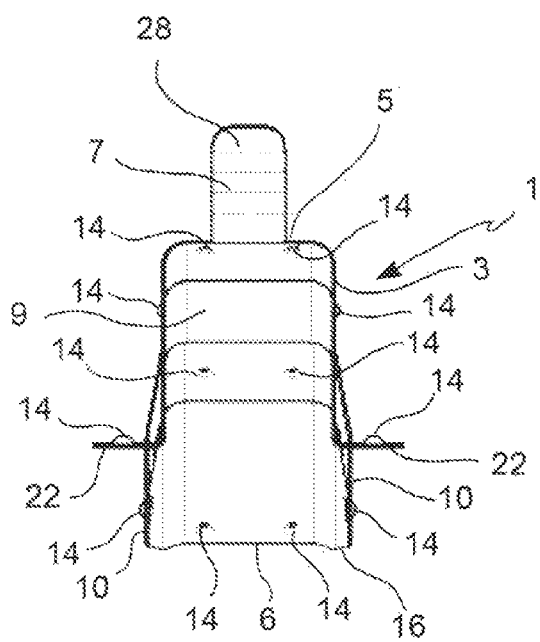
FIG. 7 is a side view taken along the circumferential direction of the element in FIG. 4.

LIST OF REFERENCES 1 heat shield element
2 brake caliper
3 heat shield element body
4 flat sheet
5 inner end
6 outer end
7 snap engagement tongues
8 disc brake disc
9 arched back
10 side shield portion
11 vehicle-side elongated portion
12 opposite wheel-side elongated portion
13 caliper bridge
14 brake caliper resting elements or spacers
15 air space
16 shape or outer perimeter
17 contiguous side-shield portion sides
18 contiguous side-shield portion sides
19 engagement portions 20 engagement seats
21 inner surface portion of a brake caliper
22 radial support of an element body of a heat shield
23 caliper assembly
24 caliper body
25 vehicle-side braking surface
26 wheel-side braking surface
27 thrust means for brake pads
28 element grip portions
X-X axial direction
R-R radial direction
C-C circumferential direction
A-A First section of the assembly according to FIG. 2
B-B Second section of the assembly according to FIG. 3

The invention claimed is:

1. A heat shield element for a brake caliper of a disc brake straddling a disc of a disc brake and having a vehicle-side elongated portion and an opposite wheel-side elongated portion connected to each other by a caliper bridge, said heat shield element comprising a heat shield element body which comprises:
at least two opposite snap engagement tongues suitable for snap engaging a portion of the brake caliper to interpose said heat shield element body between said brake caliper and said disc of disc brake and support said heat shield element engaged to said brake caliper;
at least one arched back extended along a circumferential direction following a curved line from one inner end to an outer end;
wherein said heat shield element body comprises at least two side shield portions opposite each other, each extending orthogonal to said circumferential direction in a radial plane, said at least two side shield portions forming with said arched back, transversely to said circumferential direction, an inverted "U" section suitable for placing said heat shield element body astride said disc of disc brake; and
wherein said at least two opposite snap engagement tongues are arranged one at said inner end of the arched back, the other at said outer end of the arched back, so as to mutually embrace and engage said at least one caliper bridge placing said arched back between said at least one caliper bridge and said disc of disc brake and each of said at least two side shield portions between a portion of said elongated portions and said disc of disc brake as a heat protection of the brake caliper;
wherein said heat shield element body, with said at least one arched back and the at least two side shield portions, comprises caliper spacers which constitute the only resting elements of the sheet to the brake caliper; and
said spacers are adapted to rest on the brake caliper and create an air space between said sheet body and said brake caliper; and said spacers have a limited point-like contact area between the heat shield element and the brake caliper to limit heat transfer between the heat shield element and the brake caliper.

2. The heat shield element according to claim 1, wherein said spacers have a hemispherical shape in order to obtain an abutment between the heat shield element and the brake caliper having a limited contact area, which are point-like and limit heat transfer between the heat shield element and the brake caliper; and/or wherein
said spacers are limited in number to two or four for the arched back, and/or one or two for the at least one or the set of the side shield portions, so as to limit the contact areas between the heat shield element and the brake caliper; and/or wherein
said spacers are obtained by molding of the sheet heat shield element body forming bulges suitable for projecting towards the brake caliper.

3. The heat shield element according to claim 1, wherein said heat shield element body is obtained in a single body; and/or wherein
said heat shield element body is sheet-like and is obtained from a flat sheet cut to shape and bent; and/or wherein
said heat shield element body has a shape or outer perimeter as a die-cut body which from a flat sheet configuration is suitable for bending to form said at least two snap engagement tongues, said at least one arched back and said at least two opposite side shield portions of said heat shield element.

4. The heat shield element according to claim 1, wherein each of said at least two side shield portions juts orthogonally cantilevered from said arched back; and/or wherein
each of said side shield portions are a plurality of side shield portions side by side each other as a protection of sector-like extended portions of the elongated portions of the brake caliper; and/or wherein
said plurality of side shield portions side by side each other comprise contiguous sides one having engagement seats and the other having engagement portions suitable for connecting in said engagement seats, so as to limit the movement and vibrations of said side shield portions; and/or wherein
said arched back and said plurality of side by side and opposite side shield portions are like carapace scales in a single piece suitable for being shaped into a radial and axial heat protection of an inner surface portion of a brake caliper that can face a brake disc.

5. The heat shield element according to claim 1, wherein said heat shield element body comprises at least one radial support suitable for resting as an undercut on the brake caliper preloading the snap engagement of the heat shield element when engaged with the at least one caliper bridge; and/or wherein
said at least one radial support are a pair of opposite radial supports arranged cantilevered and transverse to two opposite side shield portions.

6. The heat shield element according to claim 1, wherein each of said snap engagement tongues comprises cantilevered jutting grip portions; and/or wherein
cantilevered jutting grip portions project partially laterally and/or at the top outside the brake caliper like radiators for thermal disposal.

7. A caliper assembly for a disc brake comprising a caliper body, wherein said caliper body is suitable for straddling a brake disc, said brake disc having a first braking surface, or vehicle-side braking surface, and a second braking surface, or wheel-side braking surface, opposite said first braking surface; and wherein said caliper body comprises a first elongated portion, or vehicle-side elongated portion, suitable for facing said first braking surface, and a second elongated portion, or wheel-side elongated portion, opposite said first elongated portion and suitable for facing said second braking surface; said caliper body comprising at least one bridge connecting said first elongated portion with said second elongated portion so as to straddle the brake disc, when said caliper body is assembled to the brake disc; wherein
said at least one heat shield element according to claim 1 is snap engaged to said at least one bridge.

8. The assembly according to claim 7, wherein said caliper body is a caliper body of fixed type having opposite thrust means for brake pads housed in said opposite elongated portions; and/or wherein said caliper body is a caliper body of the floating type having thrust means for brake pads in a single one of the elongated portions.

9. A method for obtaining a heat shield element, comprising the steps of:

providing a mold;

shaping, said heat shield element body; and forming an arched back; and subsequently or simultaneously forming at least two opposite snap engagement tongues; and subsequently or simultaneously forming at least two opposite side shield portions orthogonal to said arched back;

providing a flat sheet;

cutting said flat sheet to shape;

molding an arched back; and subsequently or simultaneously molding at least two opposite snap engagement tongues; and subsequently or simultaneously molding at least two opposite side shield portions orthogonal to said arched back; and/or wherein the step of cutting said flat sheet to shape is a shearing step; and/or wherein subsequently or simultaneously with the molding of the arched back spacers are molded suitable for limiting the resting areas of the element on a caliper; and/or wherein shearing to shape provides for shearing a plurality of side shield portions and the step of engagement of side shield portions arranged side by side and contiguous to each other is provided; and/or wherein said thermal shield element is snap engaged to a caliper bridge, so that it shields heat radiation of a brake disc; and/or wherein said heat shield element is snap engaged to a caliper bridge, so as to allow the passage of air between the heat shield element and the brake caliper.

\* \* \* \* \*